United States Patent [19]

Bitar

[11] Patent Number: 5,241,278
[45] Date of Patent: Aug. 31, 1993

[54] RADIO FREQUENCY LINEAR POSITION SENSOR USING TWO SUBSEQUENT HARMONICS

[75] Inventor: Ali A. Bitar, Peoria, Ill.

[73] Assignee: Caterpillar Inc., Peoria, Ill.

[21] Appl. No.: 905,716

[22] Filed: Jun. 29, 1992

Related U.S. Application Data

[63] Continuation-in-part of Ser. No. 726,068, Jul. 5, 1991, Pat. No. 5,150,060.

[51] Int. Cl.$^5$ .................. G01R 33/32; F01B 31/12
[52] U.S. Cl. .................. 324/635; 324/633; 324/636; 324/649; 92/5 R; 91/1; 73/116
[58] Field of Search .............. 324/629, 633, 635, 636, 324/644, 649; 73/116; 91/189 R, 1; 92/5 R

[56] References Cited

U.S. PATENT DOCUMENTS

| | | |
|---|---|---|
| 3,589,177 | 6/1971 | Merlo .................. 73/116 |
| 3,726,191 | 4/1973 | Johnston et al. .................. 92/5 R |
| 4,365,503 | 12/1982 | Ho et al. .................. 73/3 |
| 4,588,953 | 5/1986 | Krage .................. 324/636 |
| 4,737,705 | 4/1988 | Bitar et al. .................. 324/633 |
| 4,901,628 | 2/1990 | Krage .................. 324/639 X |
| 4,987,823 | 1/1991 | Taplin et al. .................. 91/361 |

Primary Examiner—Gerard R. Strecker
Assistant Examiner—Diep Do
Attorney, Agent, or Firm—James R. Yee

[57] ABSTRACT

An apparatus is adapted to detect the linear extension of a hydraulic cylinder. The hydraulic cylinder defines a variable length coaxial resonant cavity. Under the control of a controller, a transmitting section and a receiving section are used to determine the linear extension of the hydraulic cylinder. The controller detects two subsequent harmonics of the resonant frequency and responsively determines the resonant frequency. The linear extension is determined as a function of the resonant frequency.

7 Claims, 9 Drawing Sheets

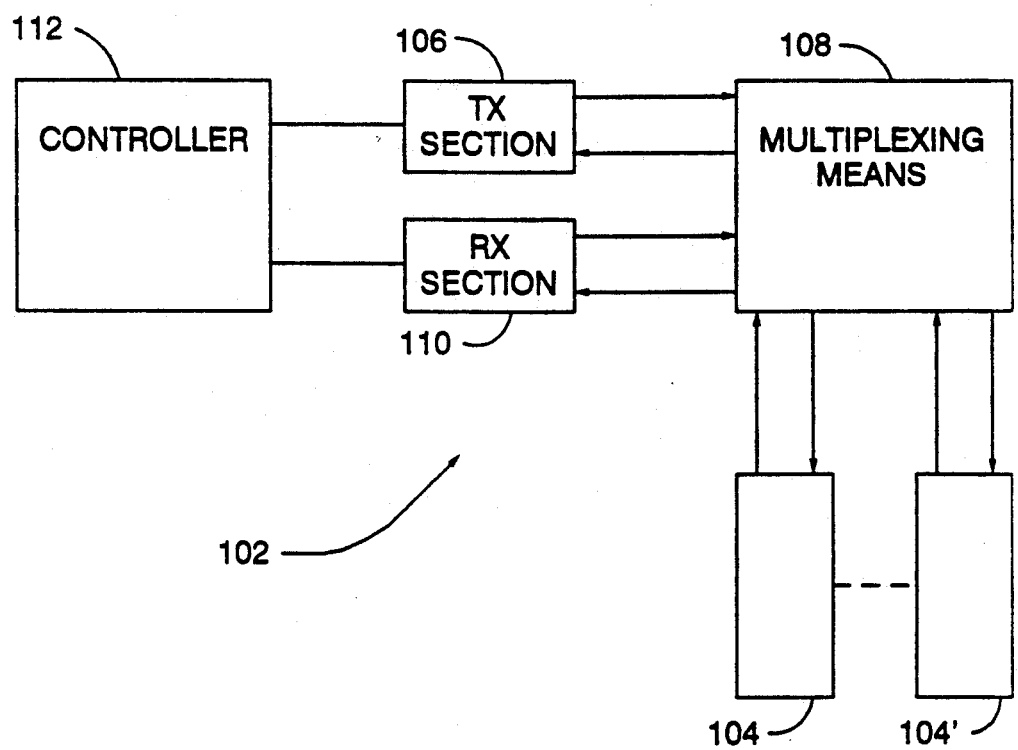
Fig_1_
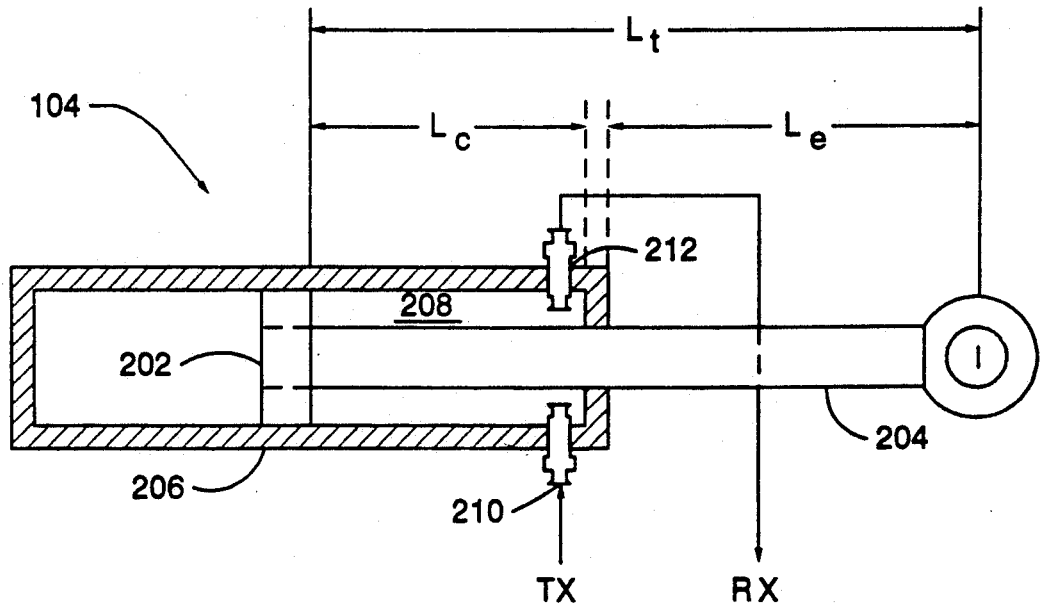
Fig_2_

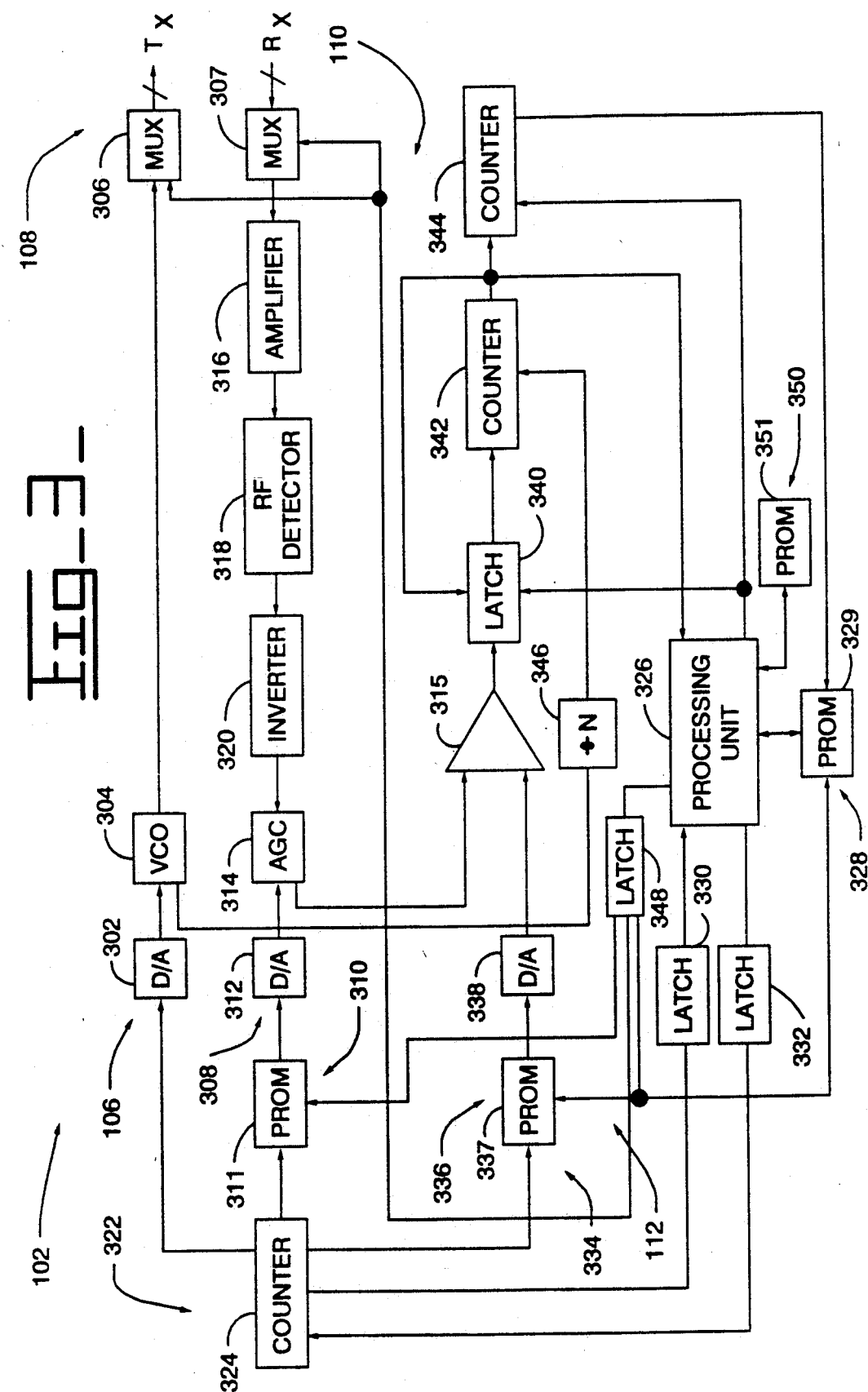

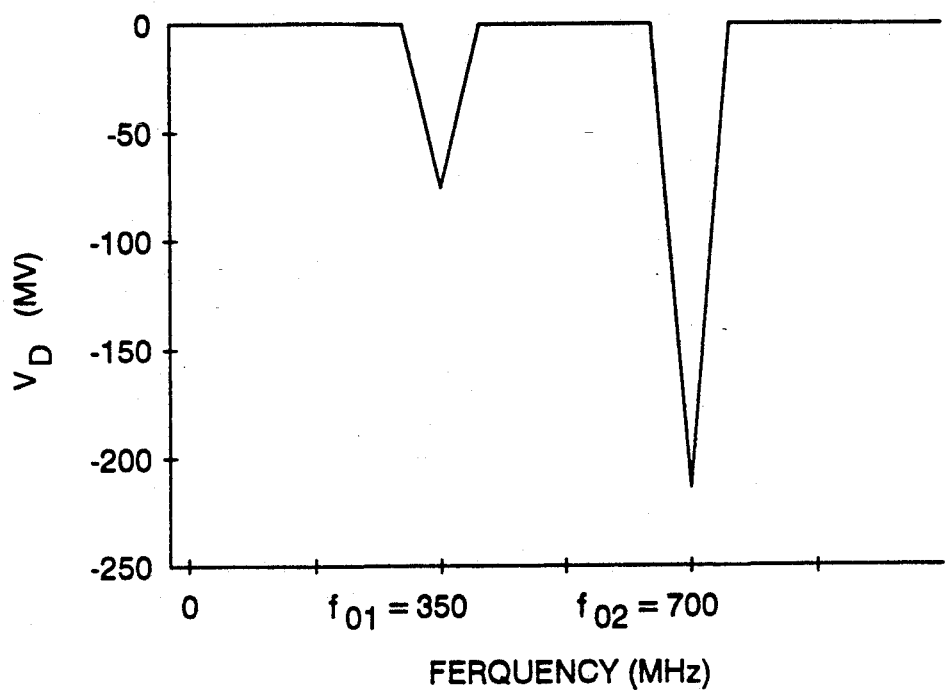
Fig_5_
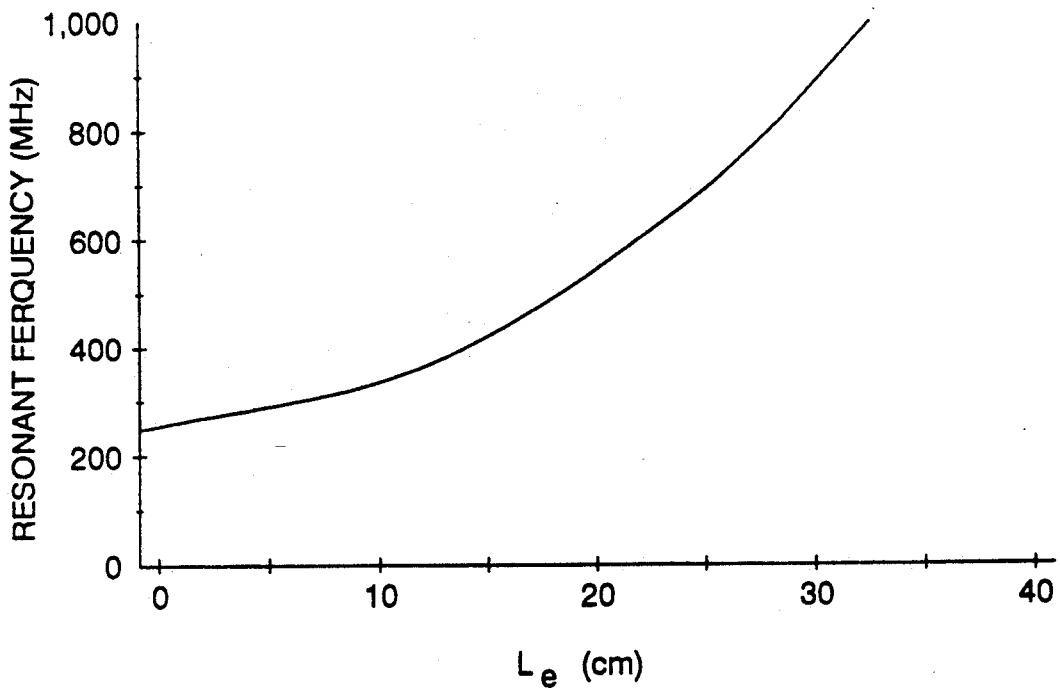
Fig_6_

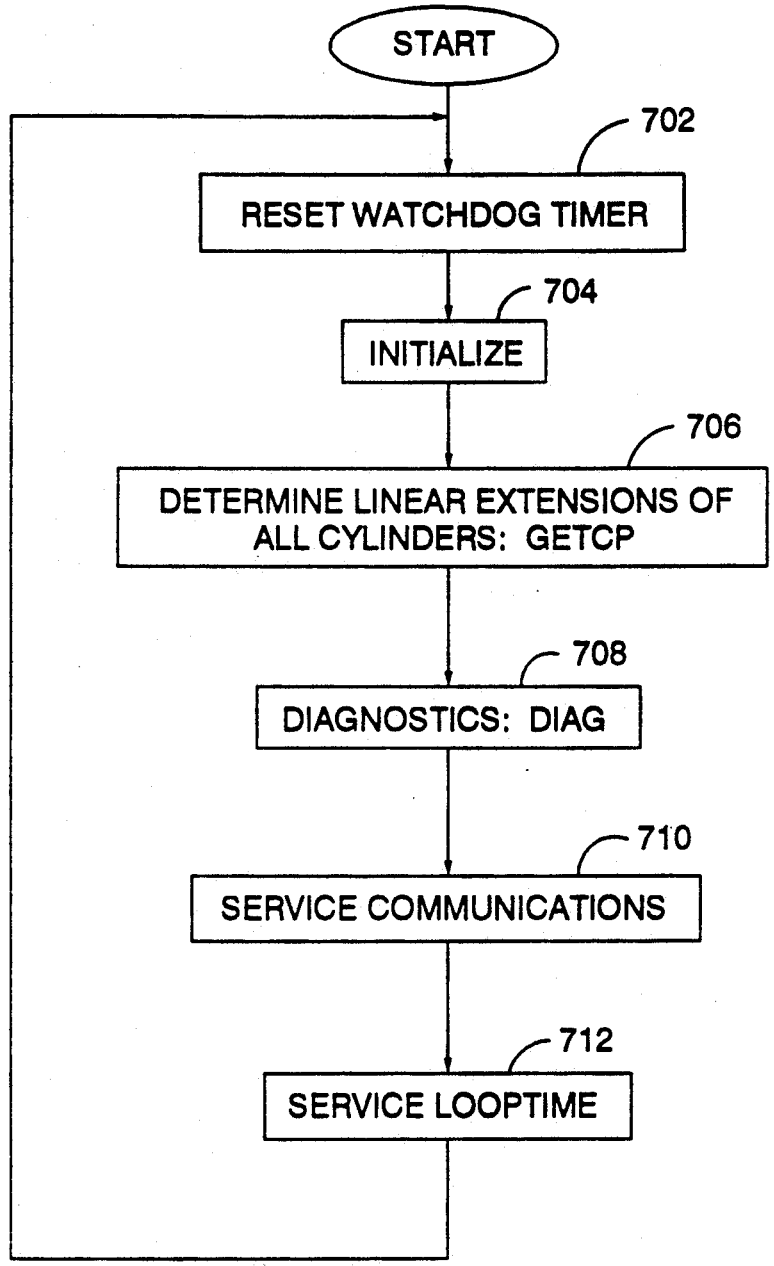
Fig_7_

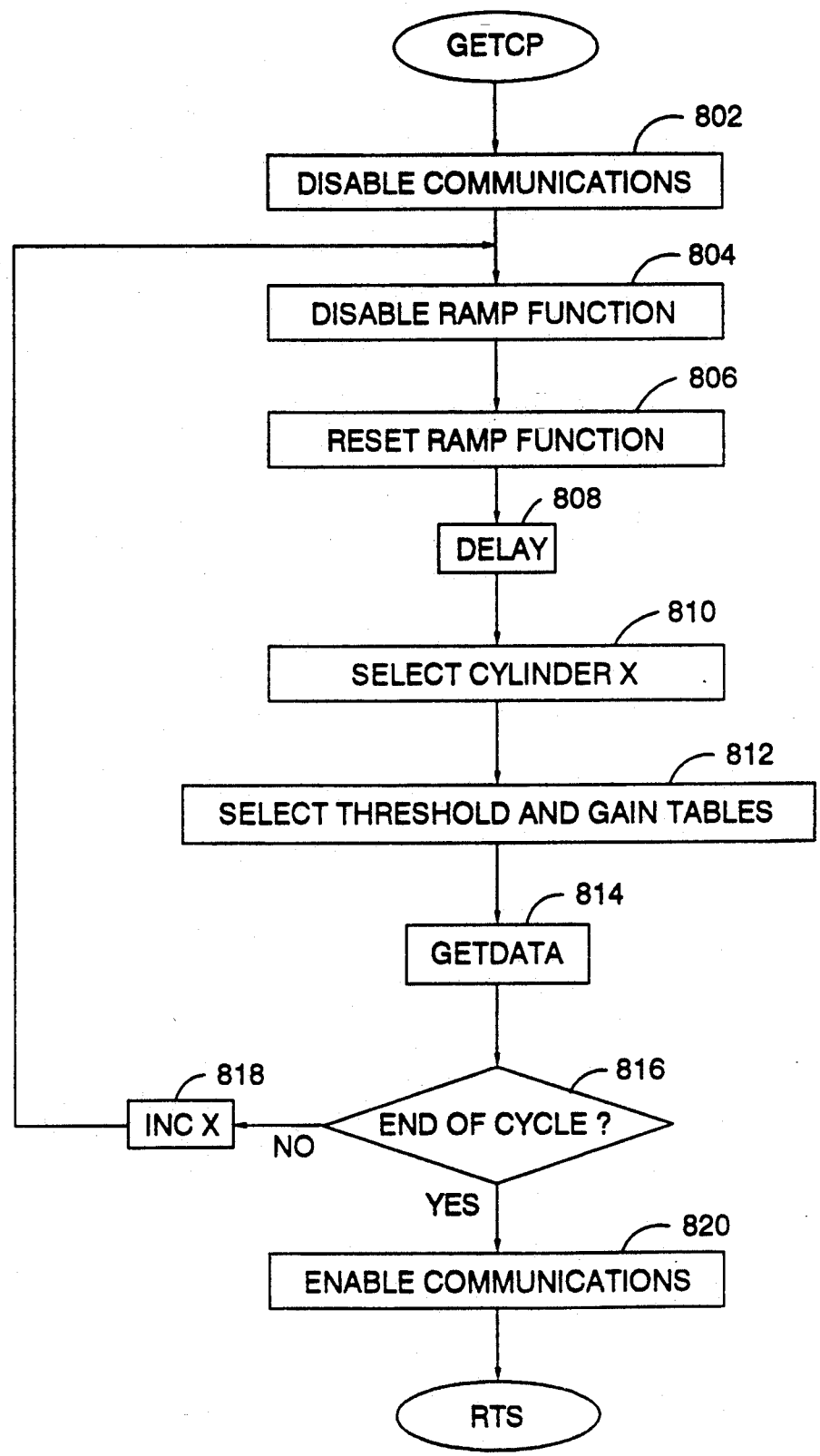
Fig_8_

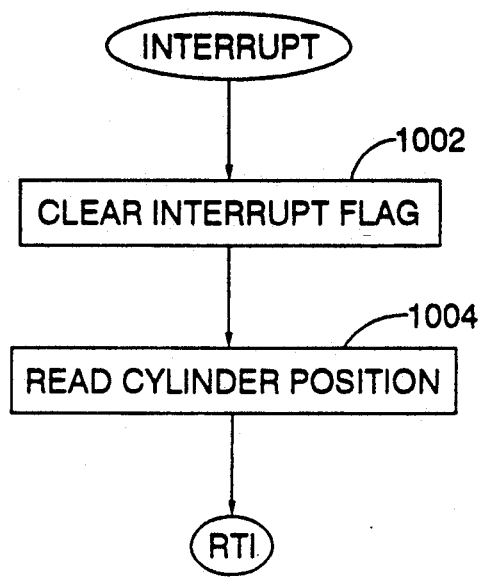
Fig_10_

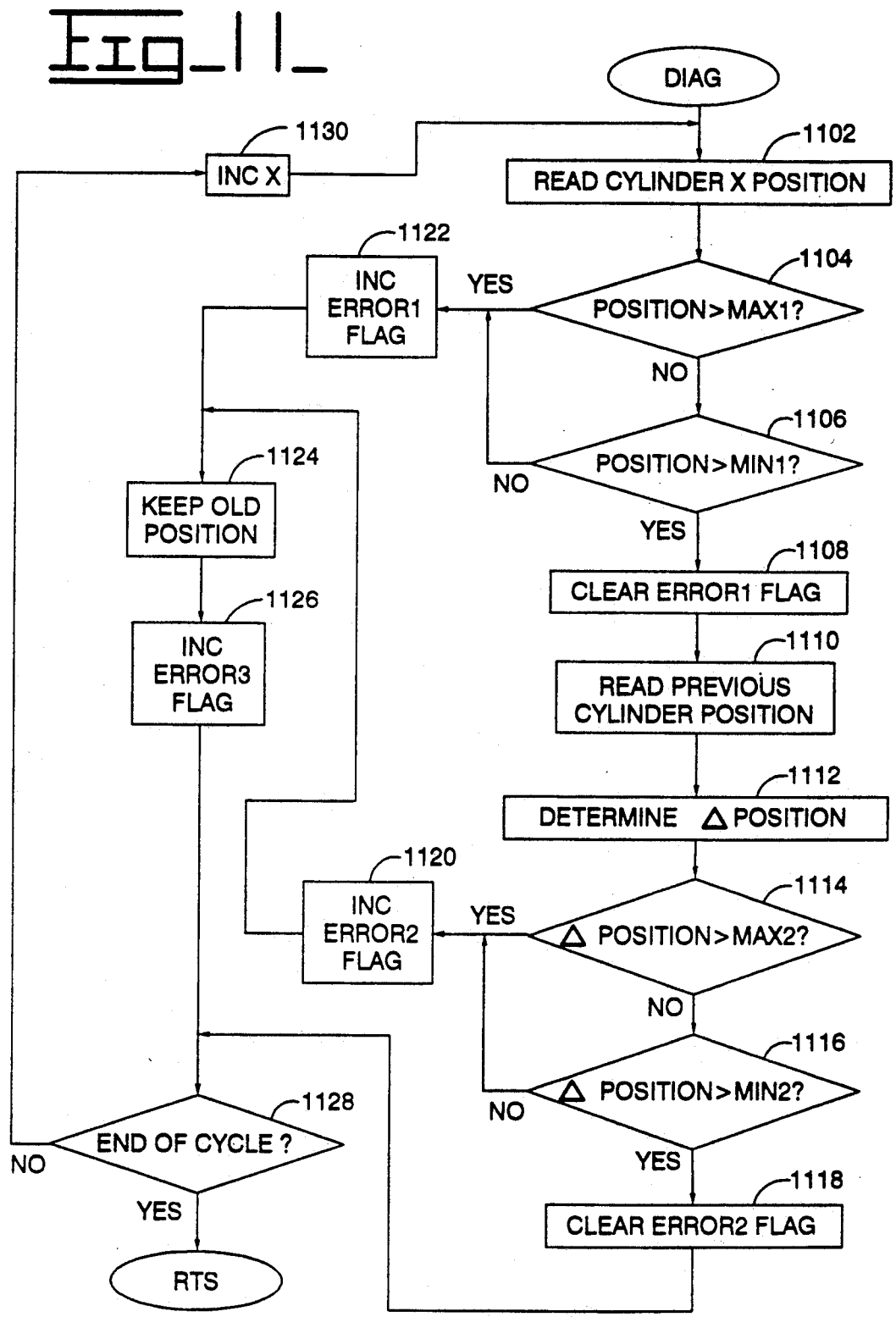

RADIO FREQUENCY LINEAR POSITION SENSOR USING TWO SUBSEQUENT HARMONICS

This is a continuation-in-part of application Ser. No. 07/726,068, filed Jul. 5, 1991, now U.S. Pat. No. 5,150,060.

TECHNICAL FIELD

This invention relates generally to linear position sensors utilizing radio frequency signals and more particularly to a multiplexed radio frequency position system.

BACKGROUND ART

In the field of hydraulic cylinders, a variety of systems have been proposed in which the displacement of the elements of the cylinder is electrically sensed and displayed or used to perform control functions. Conventional transducers have serious deficiencies owing in part to difficulties in mounting the units and the harsh environmental conditions to which they are exposed. Transducers used on hydraulic systems in the heavy equipment industry are particularly subject to damage from the severe work environment. Hydraulic cylinders are typically located in relatively unprotected areas and are typically subject to, for example, high g-forces, wide temperature variations, dust, water, debris, etc. which can result in both electrical and mechanical failure.

In one attempt to provide a sensor which is particularly suitable for the heavy equipment industry radio frequency (RF) signals are used. One such system is disclosed in U.S. Pat. No. 4,737,705 issued Apr. 12, 1988 to Bitar, et al. Bitar transmits a ramping RF signal into a coaxial resonant cavity formed by the hydraulic cylinder. When the cylinder's resonant frequency is transmitted, the signal detected by a receiving antenna reaches a peak. The resonant frequency has a one to one relationship with the cylinder's extension. Thus, by determining the cylinder's resonant frequency, the cylinder's linear extension can be determined.

However, the resonant frequency is determined by detecting its first harmonic. Therefore, the sensor has to be capable of generating a large range of frequencies in order to detect the full range of harmonics and consequently, the full cylinder extension range. This dramatically increases the cost of the sensor, especially for larger cylinders where, for example, an oscillator capable of generating frequencies from 50 to 1800 MHz may be needed.

The present invention is directed at overcoming one or more of the problems as set forth above.

DISCLOSURE OF THE INVENTION

In one aspect of the present invention, an apparatus for detecting the linear extension of a hydraulic cylinder is provided. The cylinder includes a piston, a piston rod, and a housing which define a variable length coaxial resonant cavity. The linear extension of the hydraulic cylinder is defined by the relative position of the piston and piston rod relative to the corresponding housing. The apparatus includes a transmitting section for generating an RF signal and delivering the RF signal into the coaxial resonant cavity of the hydraulic cylinder. A receiving section receives an electromagnetic wave signal from within the coaxial resonant cavity of the hydraulic cylinders, compares the magnitude of the electromagnetic wave signal to a first predetermined threshold value, responsively produces a first resonant signal, and compares the magnitude of the electromagnetic wave signal to a second predetermined threshold value and responsively produces a second resonant signal. A controller receives the first and second resonant signals and responsively determines the linear extension of the hydraulic cylinder.

In another aspect of the present invention, a method for detecting the linear extension of a hydraulic cylinder is provided. The cylinder includes a piston, a piston rod, and a housing which define a variable length coaxial resonant cavity. The linear extension of the hydraulic cylinder is defined by the relative position of each piston and piston rod relative to the corresponding housing. The method includes the steps of generating and delivering an RF signal into the coaxial cavity of the hydraulic cylinder. Electromagnetic wave signals are received from within the coaxial cavity and two subsequent harmonics of the resonant frequency of the coaxial cavity are detected. The linear position of the hydraulic cylinder is determined as a function of the two harmonics.

BRIEF DESCRIPTION OF THE DRAWINGS

FIG. 1 illustrates a block diagram of a radio frequency linear position sensor, according to an embodiment of the present invention;

FIG. 2 illustrates a stylized representation of a hydraulic cylinder;

FIG. 3 illustrates an electrical schematic of the transmitting and receiving sections and the controller of the present invention;

FIG. 5 illustrates a graphical representation of the detected RF signal versus the frequency of the input RF signal;

FIG. 6 illustrates a graphical representation of the displacement of the piston rod versus the frequency of the input RF signal;

FIG. 7 is a flow diagram of the main control loop of an embodiment of the present invention;

FIG. 8 is a flow diagram of the GETCP subroutine as called by the main control loop of FIG. 7;

FIG. 10 is a flow diagram of an interrupt routine, according to an embodiment of the present invention; and FIG. 11 is a flow diagram of the DIAG subroutine as called by the main control loop of FIG. 7.

BEST MODE FOR CARRYING OUT THE INVENTION

Figure 4:
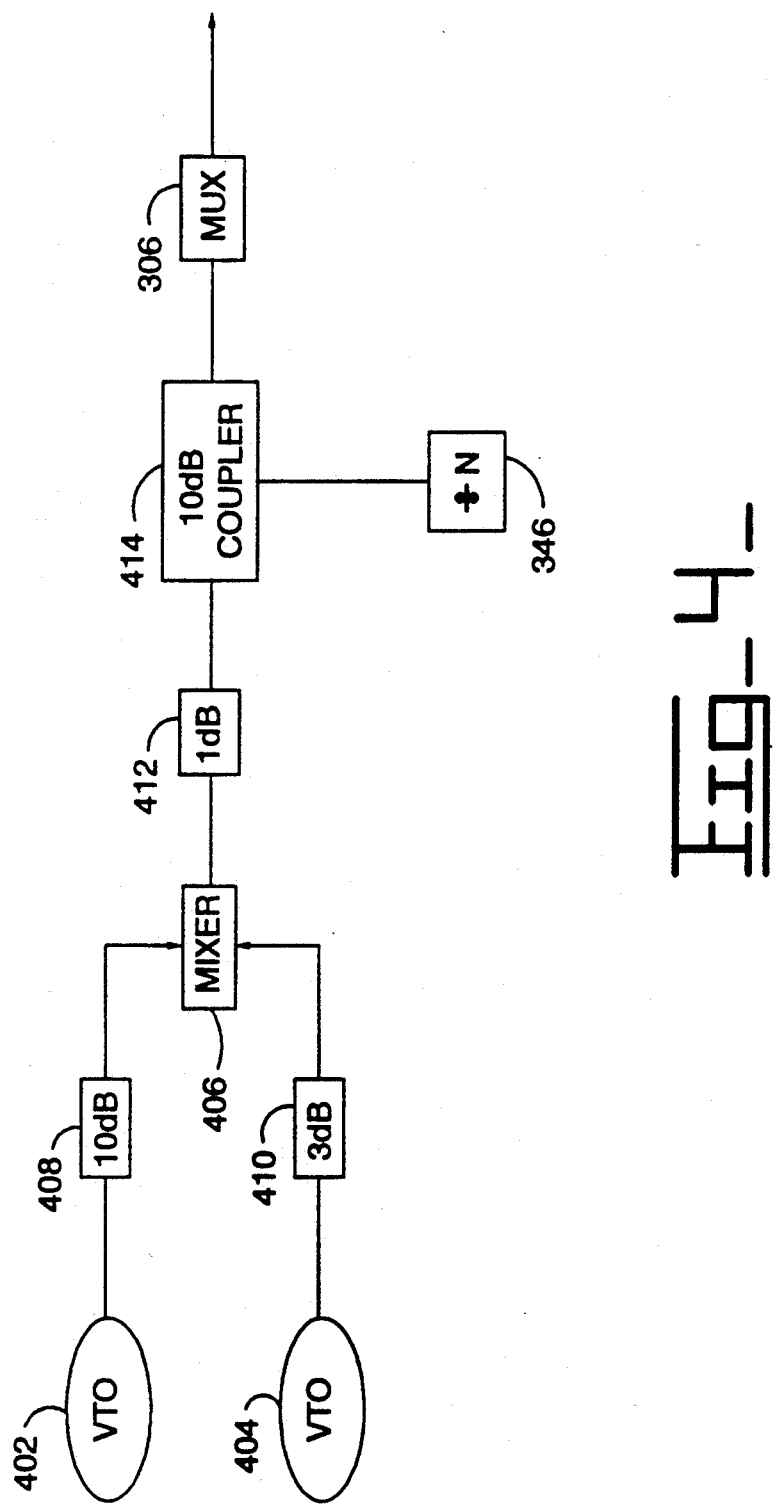
FIG. 4 illustrates a block diagram of the VCO portion of the transmitting section of the present invention.

With reference to the drawings, the RF sensor 102 is adapted to determine the linear extension of a plurality of hydraulic cylinders 104,104'. In the preferred embodiment, the sensor uses a multiplexing scheme, as described below, to selectively determine the linear extensions of the hydraulic cylinders. However, the present invention is not constrained to such a design.

As shown in the stylized representation of the conventional hydraulic cylinder 104 in FIG. 2, each hydraulic cylinder 104 includes a piston 202, piston rod 204, and a housing 206. The piston rod 204 has a total length $L_t$ and is moveable within the housing 206 to form a variable length coaxial resonant cavity 208. The cavity length $L_c$ is equivalent to the total length $L_t$ minus the length $L_e$ of the extended portion of the rod 204 plus the thickness of the housing end wall. Thus, by determining the cavity length $L_c$, the extended length $L_e$ can be directly derived and used as an indicator of the actual position of a work implement (not shown) attached to the piston rod 204.

The RF sensor 102 detects the linear extension of a plurality of hydraulic cylinders 104 by selectively transmitting radio frequency (RF) signals into the coaxial cavity 208 through a transmitting antenna 210 and receiving reflections of the transmitted RF power through a receiving 212.

The coaxial resonant cavity 208 has a response similar to a coaxial transmission line with shorted ends. The hydraulic cylinder 104 includes an electrically conductive ring (not shown) to provide electrical connection between the housing 206 and the piston rod 202.

When excited by radio frequency (RF) signal, the cavity 208 has a high insertion loss except near resonant frequencies. More specifically, if the length, $L_C$, of the cavity 208 is an integer multiple of half the wave length of the signal delivered into the coaxial cavity 208, then some RF energy is coupled into the cavity 208 exciting a transverse electromagnetic (TEM) field which can best be described as the superposition of two waves propagating along the coaxial cavity 208. The presence of this time varying electromagnetic field in the cavity 208 causes the receiving coupling element 212 to detect a signal of the same frequency. Each integer multiple is known as a harmonic or resonant frequency.

The resonant frequency of an ideal coaxial cavity is given by the equation:

$$f_{res} = n/2(c/(E_r)^{\frac{1}{2}} \cdot 1/L_c) \qquad \text{EQU. 1}$$

where $c = 3 \times 10^{10}$ cm/s, $f_{res}$ is the excitation frequency, and $E_r$ is the relative permittivity of the fluid within the cavity. The first harmonic corresponds to $n=1$, the second harmonic corresponds to $n=2$, etc.

The resonant frequency of the coaxial cavity 208 differs from that of the ideal equation owing to deviations in the geometry of the cavity 208, and from the effect of the actual coupling structure. However, a one-to-one relationship exists between the actual resonant frequency of the cavity 208 and the length of the cylinder, $L_C$, such that deviations from the ideal cavity may be accounted for by calibrating each hydraulic cylinder family type.

Referring again to FIG. 1, a transmitting section or transmitting means 106 generates an RF signal having a predetermined frequency varying between preselected minimum and maximum values and delivers the RF signal into the coaxial resonant cavity 208 of the hydraulic cylinder 104.

Referring to FIG. 3, the transmitting means 106 includes a first digital-to-analog (D/A) 302 and a voltage controlled oscillator (VCO) 304 connected in series. In the preferred embodiment, a D/A from Analog Devices Inc of Norwood, Mass., part no. ADDAC72, is used.

With reference to FIG. 4, the VCO 304 includes first and second voltage tuned oscillators (VTOs) 402,404. In the preferred embodiment, the first VTO 402 has a frequency range of 4.3 to 5.8 GHz and the second VTO is set at 5.8 GHz. Suitable VTOs are available from Avantek Inc of Hopkins, Minn., part nos. VT08430 and VT08490. The first and second VTOs 402,404 feed into a mixer 406 via first and second attenuator pads 408 and 410, respectively. In the preferred embodiment, the first and second attenuator pads 408,410 are ten decibel (10 dB) and three decibel (3 dB) 410 attenuator pads, respectively. Suitable pads are available from KDI Corp of New York, N.Y., part nos. PAM-10 and PAM-3. In the preferred embodiment, the mixer is a double balanced mixer having an intermediate frequency (IF) range of DC (0) to 2 GHz. A suitable mixer is available from Watkins-Johnson Co, as part no. WJMSH. A 1 dB attenuator pad 412 (part no. PAM-1) feeds the output of the mixer 406 into a 10 dB coupler 414. A suitable coupler is available from Mini-Circuits as part no. PDC105.

Referring again to FIG. 1, a multiplexing means 108 receives the RF signal and selectively delivers the RF signal into the coaxial resonant cavity 208 of one of the hydraulic cylinders 104,104' and receives a first electromagnetic wave signal from within the coaxial resonant cavity 208 of the one hydraulic cylinder 104.

In the preferred embodiment, the multiplexing means 108 includes first and second multiplexers 306,307. In the preferred embodiment, the first and second multiplexers 306,307 are devices available from Mini-Circuits of Brooklyn, N.Y., part no. TOSW425. The first multiplexer 306 is connected to the 1 dB coupler 414 of the voltage controlled oscillator 304 as shown in FIGS. 3 and 4.

A receiving means or receiving section 110 compares the magnitude of the electromagnetic wave signal to a predetermined threshold and responsively produces a resonant signal when the magnitude of the electromagnetic wave signal becomes greater than the predetermined threshold. The resonant signal is indicative of the detection of a harmonic of the resonant frequency of the variable length coaxial cavity 208. A resonant signal is produced for each harmonic detected.

The receiving means 110 includes an automatic gain means 308 for receiving the frequency signal and responsively determining an automatic gain signal. In the preferred embodiment, the automatic gain means 308 includes a memory means 310 and a second D/A converter 312 connected in series. The first memory means 310 includes at least one programmable read only memory (PROM) 311. In the preferred embodiment, the PROM 311 contains a number of tables containing a number of gain factors. The gain factor is dependent upon the frequency of the RF signal being transmitted and the cylinder. A suitable PROM is available from Advanced Micro Devices Inc of Sunnyvale, Calif., part no. AM27S191. The number of PROMs used is a function of the number of hydraulic cylinders and the size of the tables stored in the PROMs. A suitable D/A is available from National Semiconductor Corp of Santa Clara, Calif. as part no. DAC0800.

An automatic gain circuit (AGC) 314 receives the output of the second digital-to-analog converter 312. A suitable AGC is available from Plessey North America Corp of Chicago, Ill. as part no. SL6140. A comparator 315 compares the output of the automatic gain circuit 314 and the threshold value.

An RF amplifier 316 receives the output of the second multiplexer 307 and amplifies the received RF power. In the preferred embodiment, the RF amplifier 316 includes two amplifiers in series (part nos. A26 and A29 available from Watkins-Johnson Co of Palo Alto, Calif.).

An RF detector 318 generates a negative voltage responsive to the received RF power. The RF detector used is available from Advanced Control Components Inc of Clinton, N.J., as part no. ACSN-2094N. The output of the RF detector 318 for a cylinder having a first harmonic frequency, $f_{o1}$ of 350 MHz and a second harmonic frequency, $f_{o2}$, of 700 MHz second is shown in FIG. 5.

An inverter 320 inverts the output signal of the RF detector 318. One suitable inverter is part no. LM741 available from Motorola Inc of Roselle, Ill. The output of the inverter 320 is fed into the automatic gain circuit 314.

A controlling means 112 receives the resonant signal and responsively determines the linear extension of the hydraulic cylinders 104 as a function of the resonant frequency of variable length coaxial cavity. In the preferred embodiment, the controlling means 112 includes means for receiving first and second resonant signals. The first and second resonant signals are indicative of two subsequent harmonics of the resonant frequency. The controlling means 112 determines the resonant frequency of the coaxial cavity as the difference between the harmonic frequencies.

The controlling means 112 includes counting means 322 for generating a frequency signal having a predetermined magnitude which varies between minimum and maximum values. In the preferred embodiment, the counting means 322 includes a 16 bit digital counter 324. A suitable counter is available from Motorola Inc as part no. 74HC191.

The controlling means 112 further includes a processing unit 326 and a second memory means 328. In the preferred embodiment, the processing unit 326 is based on a MC68HC11 microprocessor available from Motorola Inc. The processing unit 326 is connected to the first digital counter 324 by first and second latches 330,332. Suitable latches are tri-state octal latches available from Motorola Inc, part no. 74HC573. In the preferred embodiment, the second memory means 328 includes a second PROM 329. A suitable PROM 329 is available from Advanced Micro Devices as part no. AM27C128. In the preferred embodiment, the second PROM 329 stores a number of lookup tables (one for each cylinder). Each lookup table is representative of the graph shown in FIG. 6. The graph of FIG. 6, illustrates the proportional relationship between the resonant frequency of the cylinder and the extended length, $L_e$ of the piston rod 204. As shown, at an extended length of zero, the resonant frequency of one hydraulic cylinder having a cavity length of approximately 24 inches, is approximately 200 MHz. The resonant frequency for a given extension is dependent upon the geometry of the cylinder. For example, another cylinder having a cavity length of approximately 70 inches may have a resonant frequency (at zero extension) down to 50 MHz.

The controlling means 112 further includes means 334 for determining the threshold values. The threshold value determining means 334 includes a third memory means 336 and a third digital-to-analog converter 338 (part no. DAC0800) connected in series. In preferred embodiment, the third memory means 336 includes a third PROM 337 (part no. AM27128). In the preferred embodiment, the third PROM 337 contains number of tables storing the threshold values for each cylinder.

A third latch 340 (part no. 74HC573) connects the output of the comparator to a second digital counter 342. A third digital counter 344 is connected to the second digital counter 342. The second digital counter 342 is connected to the voltage controlled oscillator 304 through a prescaler or divider 346. In the preferred embodiment, a 256 divider from Plessey North America, part no. SP4740 is used. The output of the second digital counter 342 is connected to the processing unit 326. The third digital counter 344 is connected to the processing unit 326 and the first memory means 328.

When the output of the AGC 314 exceeds the threshold value from the third PROM 337, the third latch enables the second digital counter 342. The second digital counter enables the third digital counter 344. The second digital counter 342 counts 128 pulses from the output of the divider 346 and the third digital counter 344 counts the time required for 128 pulses to occur. In the preferred embodiment, the third digital counter 344 uses a 16 MHz clock input.

A fourth latch 348 connects the processing unit 326 with the first and third PROMs 311,337 and the first and second multiplexers 306,307.

The control means 112 further includes a fourth memory means 350 used for temporary storage of data. In the preferred embodiment, the fourth memory means 350 includes a fourth PROM 351 (part no. AM27C128).

FIGS. 7 to 11 are flowcharts illustrating a computer software program for implementing the preferred embodiment of the present invention. The program depicted in these flowcharts is particularly well adapted for use with the microcomputer and associated components described above, although any suitable microcomputer may be utilized in practicing an embodiment of the present invention. These flowcharts constitute a complete and workable design of the preferred software program, and have been reduced to practice on the MC68HC11 microcomputer system. The software program may be readily coded from these detailed flowcharts using the instruction set associated with this system, or may be coded with the instructions of any other suitable conventional microcomputer. The process of writing software code from flowcharts such as these is a mere mechanical step for one skilled in the art.

With reference to FIG. 7, the main control loop of the software program is described. In control block 702, a timer or watchdog timer is reset. The watchdog timer is of conventional design and is used to detect if the microprocessor has become disabled. The use of a watchdog timer is well known in the art and is therefore not further discussed.

In control block 704, the system 102 is initialized. The initialization routine includes initializing the hardware, as well as constants and other software parameters.

In control block 706, the subroutine GETCP is called. As explained below, the GETCP determines the linear extension or position of all of the hydraulic cylinders. The subroutine GETCP stores the cylinder positions in the second PROM 329.

In control block 708, the diagnostic subroutine DIAG is called.

In control block 710, the systems communications are serviced. This includes reading the positions from the second PROM 329, calculating a checksum (CHKSUM) for transmission purposes and transmitting the data outside the system.

In the preferred embodiment, cylinder positions are needed every 15 ms. Therefore, the time taken for control blocks 702-710 to be performed is determined and subtracted from 15 ms. In control block 712, the program then delays or waits for the remaining time to lapse. Control then returns to control block 702.

With reference to FIG. 8, the operation of subroutine GETCP is described. In the preferred embodiment, the processing unit 326 normally handles communications first. During the subroutine GETCP, however, this is undesirable. In control block 802, communication interrupts are therefore disabled.

In the preferred embodiment, the value in the first digital counter 324 is used to control the frequency of the output of the VCO 304. The value of the counter is inversely proportional to the frequency of the VCO output signal. In order to determine the extension of the cylinder, the first counter 324 is first set to a high value and linearly decreased until a maximum frequency is reached or the extension is determined.

In control block 804, the ramp function is disabled. This ensures that the VCO 304 is turned off so that a random or undesired signal is not sent to the multiplexing means 108 through the VCO 304.

In control block 806, the ramp function is reset. This is done by resetting the first digital counter 324. In one embodiment, this is done by setting the counter 324 to a maximum value (for example, $FFFF) through latch 332.

In another embodiment, the first counter 324 is set to a value dependent upon the last known position of the cylinder. For example, if the last known position of the cylinder was 10 cm with a corresponding frequency of 300 MHz, the counter 324 may be set to a value corresponding to a frequency of less than 300 MHz.

In control block 808, the program waits for a fixed time delay of 25 microseconds.

In control block 810, the next cylinder for which the position is to be determined is selected. The processing unit 326 sends a signal to the multiplexing means 108 through the fourth latch 348. The signal controls the first and second multiplexers 306,307 to transmit/receive to/from the corresponding cylinder.

In control block 812, the threshold and gain tables are selected. The threshold and gain tables are contained in the third and first memory means 336,310, respectively.

In control block 814, the subroutine GETDATA is called. GETDATA determines the position of the cylinder designated by X.

In control block 816, the position of cylinder X is stored in the second PROM 329.

In control block 818, if the end of the cycle has been reached, that is, the position of all the cylinders has been determined, control goes to control block 824.

In control block 820, communication interrupts are enabled. Control then returns to the MAIN control loop.

If the end of the cycle has not been reached, then X is incremented (control block 820) and control returns to control block 804.

Figure 9:
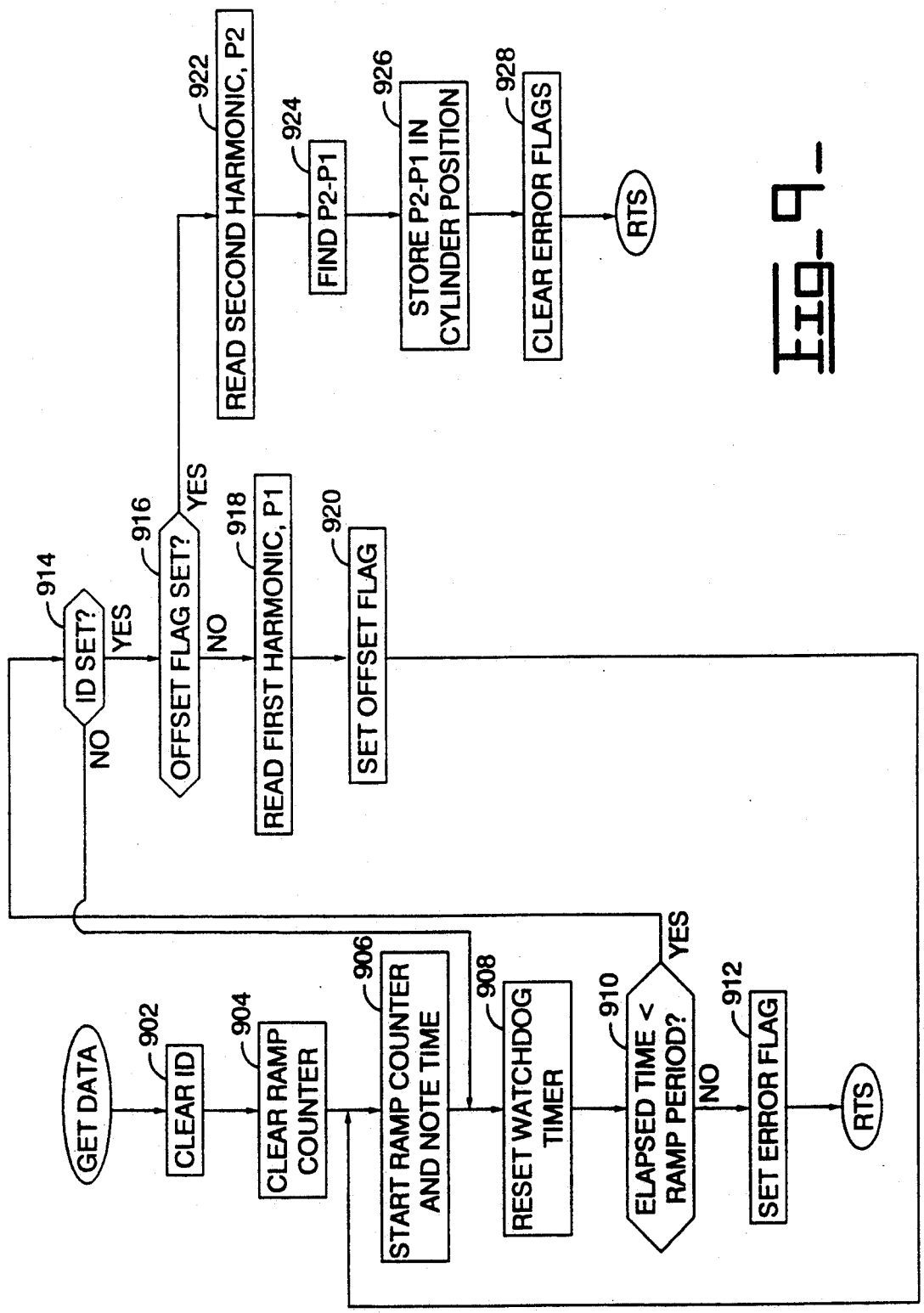
FIG. 9 is a flow diagram of the GETDATA subroutine as called by the subroutine GETCP of FIG. 8, according to one embodiment of the present invention.

With reference to FIG. 9, one embodiment of subroutine GETDATA is described. In the preferred embodiment, a hardware interrupt line (ID) is set when the linear position of the cylinder (104) has been determined. Therefore at the start of GETDATA, the interrupt line is reset (control block 902). In control block 904, the second and third digital counters 342,344 are reset (to zero). In control block 906, the ramp function is started and a timer is started. That is, the first digital counter is linearly decreased resulting in an increasing frequency RF signal being generated.

In control blocks 908-928 a loop is executed until the position of the cylinder has been determined. In control block 908, the watch dog timer is reset. In control block 910, the elapsed time is compared with a maximum ramp time. If the elapsed time is less than the maximum ramp time than control goes to control block 914. In control block 914, if the hardware interrupt line ID is set than a harmonic has been detected (see below) and control proceeds to control block 912. Otherwise, control returns to control block 908.

In control block 912, an error flag is set indicating that no position was determined and control returns to subroutine GETCP.

In control block 916, an OFFSET flag is checked. If the OFFSET flag is set, then a first detected harmonic has already been detected and control goes to control block 922. In control block 918, the first detected harmonic is read. In the preferred embodiment, this includes the steps of reading the ramp counter and adding a predetermined value to the counter value. In control block 920, the OFFSET flag is set and control returns to control block 906.

In control block 922, the second detected harmonic is read. In control block 924, the difference between the two detected harmonics is determined. And in control block 926, the difference is stored as the cylinder position.

In control block 928, the error flags are cleared and control returns to subroutine GETCP.

With reference to FIG. 10, the software interrupt routine is described. When the interrupt line ID is set, the routine is run. First, in control block 1002, the software clears the software interrupt flag. Then the cylinder position is read. This involves reading the value of cylinder extension from the second PROM 324. In the preferred embodiment, the value in the third digital counter 344 is an address of a memory location within the second PROM 324. The value of the third digital counter 344 is proportional to the resonant frequency. The counter value is then plugged into the corresponding lookup table in the second PROM 329 to determine the cylinder extension.

With reference to FIG. 11, the main control loop calls a diagnostic subroutine: DIAG. DIAG keeps track of the total number of errors (ERROR1) and looks for consecutive errors, both in position (ERROR3) and change in position or velocity (ERROR2).

In control block 1102, the POSITION or linear extension of cylinder X is read from the second PROM 329.

In control block 1104 POSITION is compared to a software set maximum position (MAX1). If POSITION>MAX1 then control goes to control block 1122. If POSITION≦MAX1 then control goes to control block 1106.

In control block 1106 POSITION is compared to a software set minimum position (MIN1). If POSITION>MIN1 then control goes to control block 1122. If POSITION≦MIN1 then control goes to control block 1108. Since POSITION is within the acceptable boundaries set by MAX1 and MIN1, the ERROR1 FLAG is cleared in control block 1108.

In control block 1110, the previous cylinder position is read from the second PROM 329. In control block the previous cylinder position is subtracted from the current POSITION to determine a ΔPOSITION.

In control block 1114 ΔPOSITION is compared to a software set maximum position (MAX2). If ΔPOSI- TION>MAX2 then control goes t control block 1120. If ΔPOSITION≦MAX2 then control goes to control block 1116.

In control block 1116, POSITION is compared to a software set minimum position (MIN2). If ΔPOSITION>MIN2 then control goes to control block 1120. If ΔPOSITION≦min2 then control goes to control block 1118. Since ΔPOSITION is within the acceptable boundaries set by MAX2 and MIN2, the ERROR2 FLAG is cleared in control block 1108.

In control blocks 1120,1122 the ERROR2 and ERROR1 flags are incremented, respectively. The ERROR1 and ERROR2 flags keep track of the number of consecutive position and velocity errors, respectively.

In control block 1124, since the new position is out of acceptable bounds (position or velocity) the previous position is stored as the current position. In control block 1126, the ERROR3 flag is incremented. ERROR3 keeps track of the total number of errors, position or velocity.

In control clock 1128, if all the cylinder positions have been checked then control returns to the main control loop. Otherwise, X is incremented (control block 1130) and control returns to control block 1102.

INDUSTRIAL APPLICABILITY

With reference to the drawings and in operation, the RF sensor 102 is adapted to determine the linear extensions of a plurality of hydraulic cylinders 104. For the purposes of discussion, the operation of the system 102 will be described with two cylinders 104,104'.

The sensor 102 cycles through main control loop every 15 ms and determines the linear position of each hydraulic cylinder. Then the sensor 102 supplies the position of each hydraulic cylinder every 15 ms to a separate external system (not shown). The external system may use this information for display purposes or in a control system which is adapted to control the movement of the hydraulic cylinders 104,104'. For example, the cylinders 104,104' may actuate the boom and stick of an earth moving excavator's linkage. The position of each cylinder would be used to provide feedback to the control system.

The sensor 102 determines the linear extension of each cylinder 104 as a function of the resonant frequency. In the preferred embodiment, the resonant frequency is determined by finding two subsequent harmonics of the resonant frequency. The resonant frequency can then be determined as the difference between the two harmonics. Preferably, the two lowest order harmonics are used. For example, if the first harmonic is undetectable because of the size of the cavity, the second and third harmonics are used.

Other aspects, objects, and advantages of the present invention can be obtained from a study of the drawings, the disclosure, and the appended claims.

I claim:

1. An apparatus for detecting the linear extension of a hydraulic cylinder having a piston, a piston rod, and a housing, and defining a variable length coaxial resonant cavity, the linear extension of the hydraulic cylinder being defined by the relative position of the piston and piston rod relative to the housing, comprising:

transmitting means for generating an RF signal having a predetermined frequency varying between preselected minimum and maximum values and delivering said RF signal into the coaxial resonant cavity of the hydraulic cavity;

receiving means for an electromagnetic wave signal from within the coaxial resonant cavity of the hydraulic cylinder, comparing the magnitude of said electromagnetic wave signal to a first predetermined threshold value, and responsively producing a first signal, and for comparing the magnitude of said electromagnetic wave signal to a second predetermined threshold value and responsively producing a second signal; and controlling means for receiving said first and second signals, responsively determining two subsequent harmonics of the resonant frequency of the variable length coaxial resonant cavity as a function of said first and second signals, and determining the linear extension of said hydraulic cylinder as a function of said two subsequent harmonics.

2. An apparatus, as set forth in claim 1, wherein said two harmonics are subsequent.

3. An apparatus, as set forth in claim 1, wherein said controlling means includes means for receiving said two subsequent harmonics and determining the resonant frequency of the hydraulic cylinder as a function of the difference between said two subsequent harmonics.

4. An apparatus, as set forth in claim 1, wherein said controlling means includes means for detecting two subsequent harmonics of the resonant frequency of the variable length coaxial cavity, responsively determining the resonant frequency of the variable length coaxial cavity, and wherein said determined linear extension is a function of said resonant frequency.

5. An apparatus, as set forth in claim 1, wherein said controlling means includes counting means for generating a frequency signal having a predetermined magnitude varying between minimum and maximum values and wherein said transmitting means includes means for receiving said frequency signal and wherein said predetermined frequency of said RF signal is proportional to the magnitude of said frequency signal.

6. An apparatus for detecting the linear extension of a hydraulic cylinder having a piston, a piston rod, and a housing, and defining a variable length coaxial resonant cavity, the linear extension of the cylinder being defined by the relative position of the piston and piston rod relative to the housing, comprising:

transmitting means for generating an RF signal having a predetermined frequency varying between preselected minimum and maximum values and delivering said RF signal into the coaxial resonant cavity of the hydraulic cavity;

receiving means for receiving an electromagnetic wave signal from within the coaxial resonant cavity of the hydraulic cylinder, comparing the magnitude of said electromagnetic wave signal to a first predetermined threshold value, and responsibility producing a first signal, and for comparing the magnitude of said electromagnetic wave signal to a second predetermined threshold value and responsively producing a second signal; and controlling means for receiving said first and second signals, responsively determining two subsequent harmonics of the resonant frequency of the variable length coaxial resonant cavity as a function of said first and second signals, and determining the linear extension of said hydraulic cylinder as a function of the difference between said two subsequent harmonics.

7. A method for detecting the linear extension of a hydraulic cylinder having a piston, a piston rod, and a housing and defining a variable length coaxial resonant cavity, the linear extension of the cylinder being defined by the relative position of the piston and piston rod relative to the housing, including the steps of:

generating an RF signal having a predetermined frequency varying between minimum and maximum values;

delivering said generated RF signal into the coaxial cavity of the hydraulic cylinder;

receiving electromagnetic wave signals from within the coaxial cavity and responsively detecting two subsequent harmonics of the resonant frequency of the coaxial cavity; and determining the resonant frequency of the variable length coaxial cavity as a function of the difference between said two subsequent harmonics and determining the linear position of the hydraulic cylinder as a function of said resonant frequency.

* * * * *